United States Patent
Qi et al.

(10) Patent No.: US 9,639,959 B2
(45) Date of Patent: May 2, 2017

(54) MOBILE DEVICE CONFIGURED TO COMPUTE 3D MODELS BASED ON MOTION SENSOR DATA

(71) Applicant: QUALCOMM Incorporated, San Diego, CA (US)

(72) Inventors: Yingyong Qi, San Diego, CA (US); Ruiduo Yang, San Diego, CA (US); Sairam Sundaresan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 92 days.

(21) Appl. No.: 13/673,681

(22) Filed: Nov. 9, 2012

(65) Prior Publication Data

US 2013/0194392 A1 Aug. 1, 2013

Related U.S. Application Data

(60) Provisional application No. 61/591,196, filed on Jan. 26, 2012.

(51) Int. Cl.
*H04N 13/00* (2006.01)
*G06T 7/564* (2017.01)
(Continued)

(52) U.S. Cl.
CPC .............. *G06T 7/564* (2017.01); *G06T 7/579* (2017.01); *H04N 13/0207* (2013.01); *G06T 2207/10016* (2013.01)

(58) Field of Classification Search
CPC .............. H03M 13/2966; H03M 13/31; H04N 19/00781; H04N 19/00884;
(Continued)

(56) References Cited

U.S. PATENT DOCUMENTS 7,343,268 B2  3/2008  Kishikawa
2001/0056544 A1*  12/2001  Walker .......................... 713/200
(Continued)

FOREIGN PATENT DOCUMENTS

CN  101395613 A  3/2009
CN  102012625 A  4/2011
(Continued)

OTHER PUBLICATIONS

Iwamoto Y., et al.,"Bundle Adjustment for 3-D Reconstruction: Implementation and Evaluation," IPSJ SIG Technical Report Heisei 22nd 5 [CD-ROM], The Information Processing Society of Japan, Feb. 15, 2011, vol. 2011—CVIM-175, No. 19, p. 1-8.
(Continued)

*Primary Examiner* — Frank Huang
(74) *Attorney, Agent, or Firm* — Toler Law Group, PC

(57) ABSTRACT

A particular method includes determining, based on data received from at least one motion sensor, a movement of a mobile device from a first position to a second position. The method also includes computing a three-dimensional (3D) model of an object based on a first image of the object corresponding to a first view of the object from the first position of the mobile device, a second image of the object corresponding to a second view of the object from the second position of the mobile device, and the movement of the mobile device.

26 Claims, 11 Drawing Sheets

(51) Int. Cl.
*H04N 13/02* (2006.01)
*G06T 7/579* (2017.01)

(58) Field of Classification Search
CPC ......... H04N 21/23608; H04N 21/2383; H04N 21/4344; H04N 21/04; H04N 1/3876; H04N 9/8205; H04N 21/84; H04N 21/4788; H04N 5/781; H04N 2201/3214; H04N 2201/3215; H04N 2201/3253; H04N 7/00; H04N 5/23238; G06K 9/32; G06K 9/00; G06K 9/36; G06F 17/30265; G06T 11/00; G03B 37/04; G09G 5/00
USPC ............................ 348/50; 375/240.26, 240.1
See application file for complete search history.

(56) References Cited

U.S. PATENT DOCUMENTS

| | | | |
|---|---|---|---|
| 2002/0029127 | A1 | 3/2002 | Wakashiro |
| 2003/0058238 | A1* | 3/2003 | Doak et al. ............... 345/419 |
| 2005/0276448 | A1* | 12/2005 | Pryor ........................ 382/103 |
| 2006/0136180 | A1* | 6/2006 | Hansen et al. ................ 703/1 |
| 2007/0063997 | A1* | 3/2007 | Scherer et al. ........... 345/419 |
| 2007/0183653 | A1 | 8/2007 | Medioni et al. |
| 2007/0185587 | A1* | 8/2007 | Kondo ....................... 700/19 |
| 2007/0248260 | A1 | 10/2007 | Pockett |
| 2008/0118184 | A1 | 5/2008 | Panabaker et al. |
| 2008/0219654 | A1* | 9/2008 | Border et al. ............. 396/89 |
| 2009/0231453 | A1 | 9/2009 | Huang |
| 2010/0316282 | A1 | 12/2010 | Hope |
| 2011/0096954 | A1* | 4/2011 | Dahl ........................ 382/103 |
| 2011/0234750 | A1 | 9/2011 | Lai et al. |
| 2011/0254837 | A1 | 10/2011 | Kang et al. |
| 2011/0261187 | A1 | 10/2011 | Wang et al. |
| 2012/0182392 | A1 | 7/2012 | Kearns et al. |
| 2013/0162785 | A1 | 6/2013 | Michot et al. |
| 2014/0247325 | A1* | 9/2014 | Wu ................... H04N 5/23206 348/39 |

FOREIGN PATENT DOCUMENTS

| | | |
|---|---|---|
| JP | 2002501349 A | 1/2002 |
| JP | 2006234703 A | 9/2006 |
| JP | 2009200713 A | 9/2009 |
| JP | 2013534616 A | 9/2013 |
| WO | 9935855 A1 | 7/1999 |
| WO | 2011144408 A1 | 11/2011 |

OTHER PUBLICATIONS

Hartley, et al., "Multiple View Geometry in Computer Vision", Second edition, Cambridge University Press, p. 611-614, 2003.
Kaushik, et al. "3D Map Construction Using Heterogeneous Robots", 10th International Conference on Control, Automation, Robotics and Vision, 2008, p. 1230-1235.
Sunderhauf, et al. "Visual Odometry Using Sparse Bundle Adjustment on an Autonomous Outdoor Vehicle", 2005, p. 157-163.
Joubert, Daniek, "Motion Estimation for Multi-View Object Reconstruction", Applied Mathematics Honours Project, University of Stellenbosch, 2010, p. 1-16.
"Bundle Adjustment", from Wikipedia, the Free Encyclopedia, viewed Jan. 23, 2012, p. 1-3.
Zhu, Zhigang, et al., "Stereo Mosaics from a Moving Video Camera for Environmental Monitoring," First International Workshop on Digital Computational Video, Tampa, Florida, Dec. 10, 1999, 10 pages.
Lourakis M.I.A., et al., "Efficient 3D Camera Matchmoving Using Markerless, Segmentation-Free Plane Tracking", Forth-ICS/TR-324, Computational Vision and Robotics Laboratory, Sep. 2003, pp. 1-29.
Matusik W., et al., "Image-Based Visual Hulls", Proceedings of the 27th annual conference on Computer graphics and interactive techniques, 2000, pp. 369-374.
Bastian, John et al., "Interactive Modelling for AR Applications," IEEE International Symposium on Mixed and Augmented Reality, Seoul, Korea, Oct. 13-16, 2010, pp. 199-205.
Clark, Robert R. et al., "3D environment capture from monocular video and inertial data," Proceedings of Spie-IS&T, vol. 6056, Feb. 2, 2006, pp. 60560G-1-60560G-12.
Lourakis, Manolis I.A. et al. "The Design and Implementation of a Generic Sparse Bundle Adjustment Software Package Based on the Levenberg-Marquardt Algorithm," Technical Report, Fourth-ICS TR-340, Aug. 2004, 23 pages.
International Search Report and Written Opinion for International Application No. PCT/US2012/069088 mailed Mar. 19, 2013, 14 pages.

* cited by examiner

MOBILE DEVICE CONFIGURED TO COMPUTE 3D MODELS BASED ON MOTION SENSOR DATA

I. CROSS-REFERENCE TO RELATED APPLICATIONS

The present application claims the benefit of U.S. Provisional Patent Application No. 61/591,196, filed Jan. 26, 2012, the disclosure of which is incorporated by reference herein in its entirety.

II. FIELD

The present disclosure is generally related to generating three-dimensional (3D) models of objects.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Also, such wireless telephones can process executable instructions, including software applications, such as a web browser application, that can be used to access the Internet. As such, these wireless telephones can include significant computing capabilities and may be capable of graphics processing of three-dimensional (3D) objects.

A three-dimensional (3D) model of an object may be generated based on multi-view images of an object (e.g., multiple views of the object taken by one or more cameras from different angles and/or positions). The 3D models may provide useful and interesting information to a user of a wireless device and may improve an overall user experience. 3D reconstruction may be used in security, surveillance, and robotics. In addition, 3D reconstruction may be used for developing models of buildings for generating virtual tours or for navigational purposes. Furthermore, objects that may have been destroyed may be reconstructed and preserved (e.g., in museums).

IV. SUMMARY

Systems and methods of motion regularized object reconstruction in multi-view processing of a wireless device are disclosed. The disclosed embodiments utilize motion information of the wireless device provided by one or more motion sensors to reduce the complexity of generating a three-dimensional (3D) model (e.g., a 3D structure) in connection with one or more 3D reconstruction techniques.

According to a particular example, a feature point-based reconstruction technique (e.g., a bundle adjustment technique) is used in connection with motion sensor data to calculate a 3D model. According to some approaches, bundle adjustment is a "maximum likelihood solution" for the following expression $$\min_{P^i, X_j} \sum_{i,j} d(P^i X_j, x_j^i)^2,$$

where $P^i$ is an i-th projection matrix of the camera (i.e., a representation of feature points of the object taken by the camera and projected onto an i-th image), where $X_j$ is a j-th feature point of the object, where $x_j^i$ are are coordinates of the j-th feature point in the i-th image, and where d(.) represents a distance function, as explained further below. Feature points of an object include parts of the object that may be important for generating a 3D model of the object (e.g., corners in the object, curves in the object, edges of the object, etc.). For example, feature points may include the handle of a mug, corners of a graphics pattern of the mug, portions of the mug that include text, and the base of the mug.

According to at least one use of the bundle adjustment technique, initial (e.g., i=1) and subsequent (e.g., i=2, 3, . . . , n) projection matrices $P^i$ estimating position and orientation of the camera from the initial position to subsequent positions of the camera are estimated. The feature points $X_j$ of the object are estimated, and coordinates of the feature points $x_j^i$ in multiple images of the object captured by the camera are also estimated. The bundle adjustment solution may result in a large and computationally intensive problem because of the large number of parameters to be estimated. Thus, the bundle adjustment solution may be computationally demanding and may place a burden on processor resources.

According to at least one embodiment of the present disclosure, complexity of the bundle adjustment technique may be reduced by using motion sensor data to determine $P^{i+1}$ (or an estimate of $P^{i+1}$). For example, bundle adjustment complexity may be reduced according to the expression:

$$\min_{P^i, X_j} \sum_{i,j} d(P^i X_j, x_j^i)^2,$$

subject to $P^{i+1} = [R_i | T_i] P^i$, where $R_i$ and $T_i$ are rotational and translation matrices, respectively, and $[R_i | T_i]$ is a relative pose matrix associated with the wireless device that is based on measurements made by the one or more sensors of the wireless device. Thus, at least one i-th+1 projection matrix may be derived from the motion information of the wireless device provided by the one or more motion sensors, and need not be iteratively estimated via the bundle adjustment technique, resulting in reduced overall complexity.

According to another particular example, motion sensor measurements are used to derive camera location information to generate a silhouette-based 3D object (e.g., a 3D object generated using a visual hull technique). By using the motion sensor measurements, silhouette-based 3D models can be generated effectively by a mobile device (e.g., a device that is not associated with a "fixed" or predetermined location).

In a particular embodiment, a method includes capturing, at a camera of a mobile device, a first image of an object while the mobile device is at a first position and capturing a second image of the object while the mobile device is at a second position. The method includes determining, based on data output by at least one motion sensor of the mobile device, a movement of the mobile device from the first position to the second position. The method also includes computing a three-dimensional (3D) model of the object based on the first image, the second image, and the determined movement of the mobile device.

In a particular embodiment, an apparatus includes a camera configured to capture a first image of an object while at a first position and to capture a second image of the object while at a second position. The apparatus includes at least one motion sensor, a processor, and a memory storing instructions executable by the processor. The instructions are executable to determine, based on data output by the at least one motion sensor, a movement of the camera from the first position to the second position and to compute a three-dimensional (3D) model of the object based on the first image, the second image, and the determined movement of the camera.

In a particular embodiment, a method includes determining, based on data received from at least one motion sensor, a movement of a mobile device from a first position to a second position. The method also includes computing a three-dimensional (3D) model of an object based on a first image of the object corresponding to a first view of the object from the first position of the mobile device, based further on a second image of the object corresponding to a second view of the object from the second position of the mobile device, and based further on the movement of the mobile device.

In a particular embodiment, an apparatus includes means for determining, based on data received from at least one means for sensing motion, a movement of a mobile device from a first position to a second position. The apparatus also includes means for computing a three-dimensional (3D) model of an object based on a first image of the object corresponding to a first view of the object from the first position of the mobile device, based further on a second image of the object corresponding to a second view of the object from the second position of the mobile device, and based further on the movement of the mobile device.

In a particular embodiment, a computer-readable non-transitory medium includes instructions that, when executed by a processor, cause the processor to determine, based on data received from at least one motion sensor, a movement of a mobile device from a first position to a second position. The instructions are further executable to compute a three-dimensional (3D) model of an object based on a first image of the object corresponding to a first view of the object from the first position of the mobile device, based further on a second image of the object corresponding to a second view of the object from the second position of the mobile device, and based further on the movement of the mobile device.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

Figure 1:
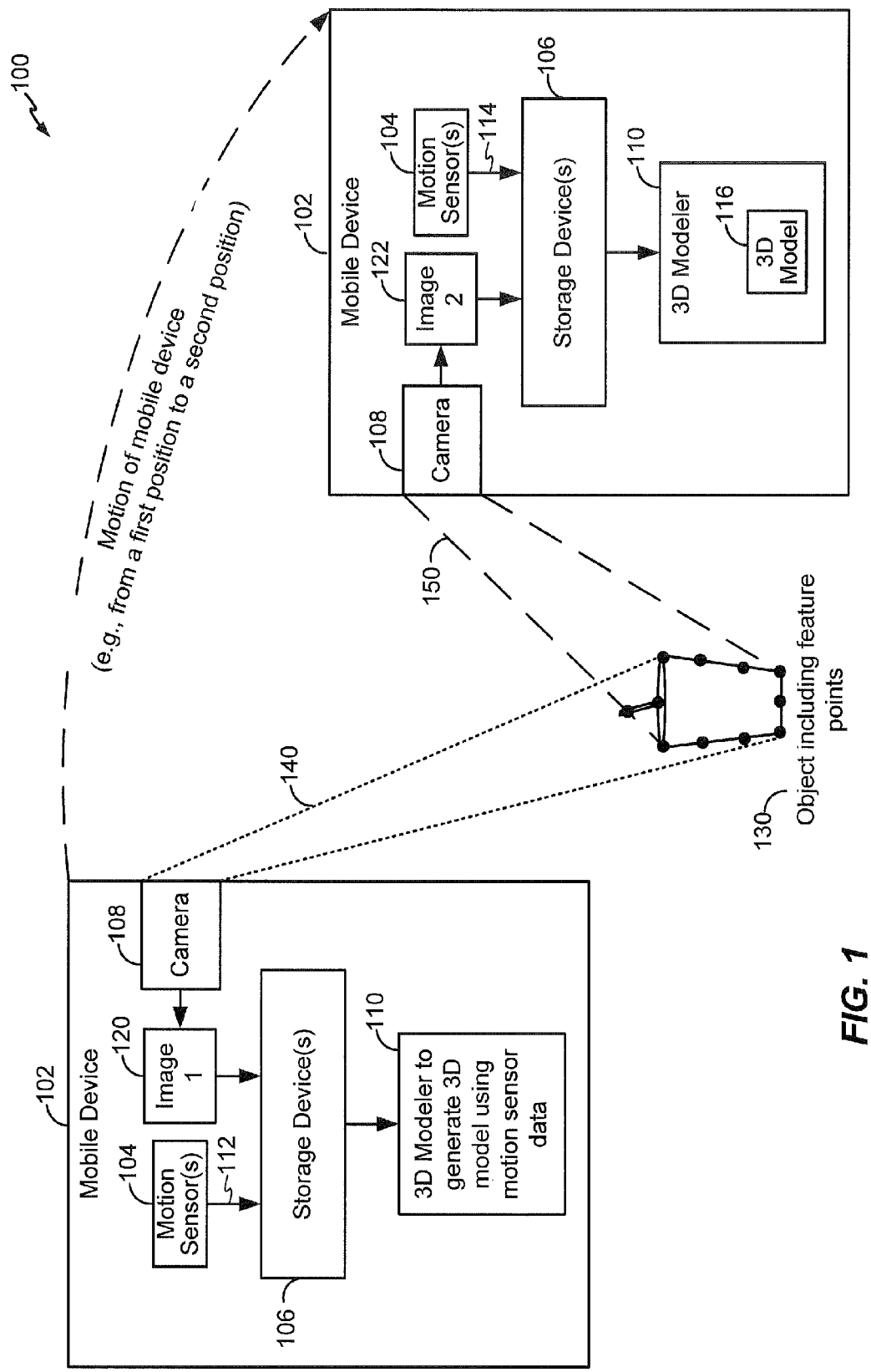
FIG. 1 is a diagram of a particular embodiment of a system that includes a mobile device configured to compute 3D models based on motion sensor data.
Figure 10:
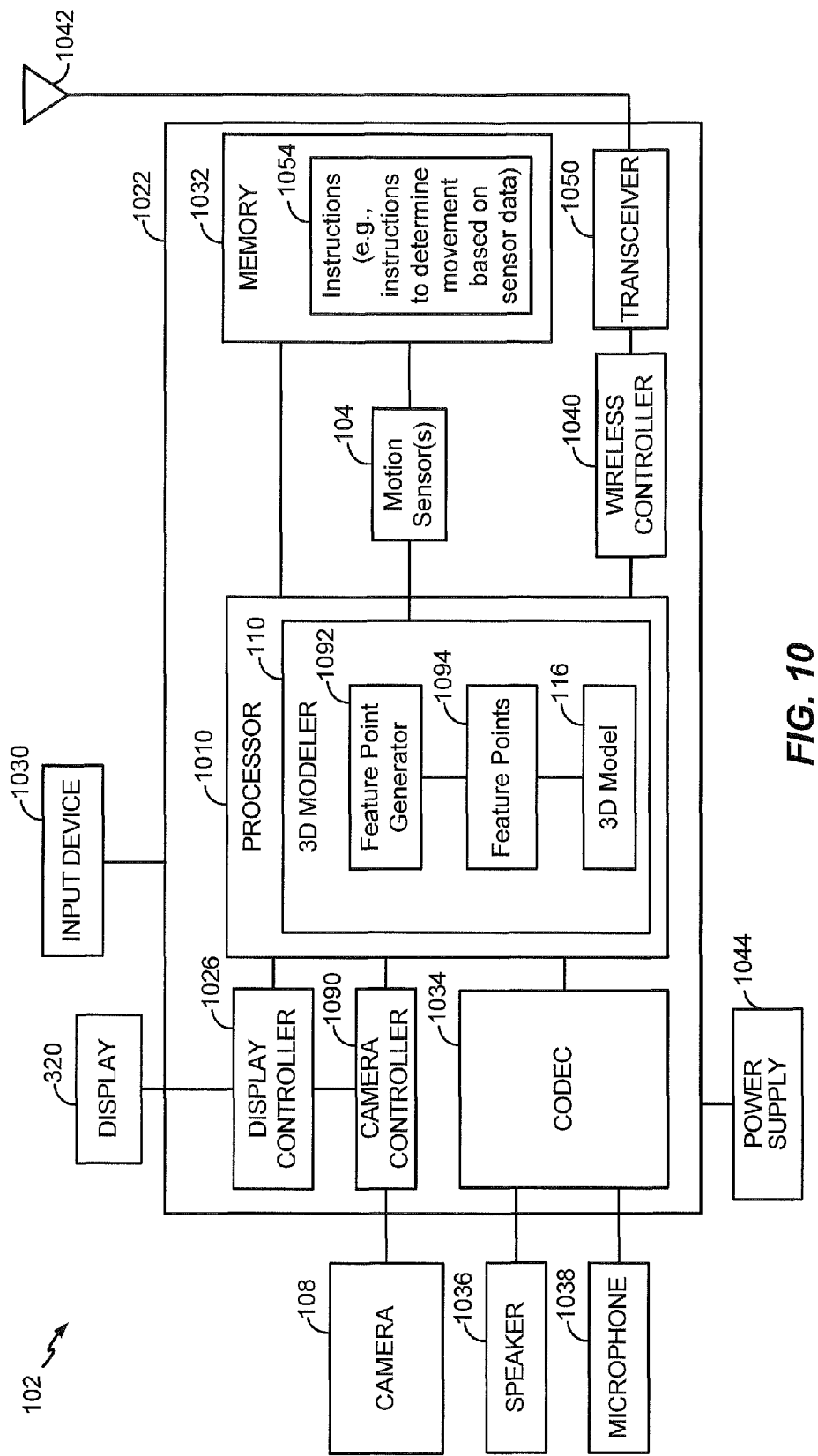
Figure 11:
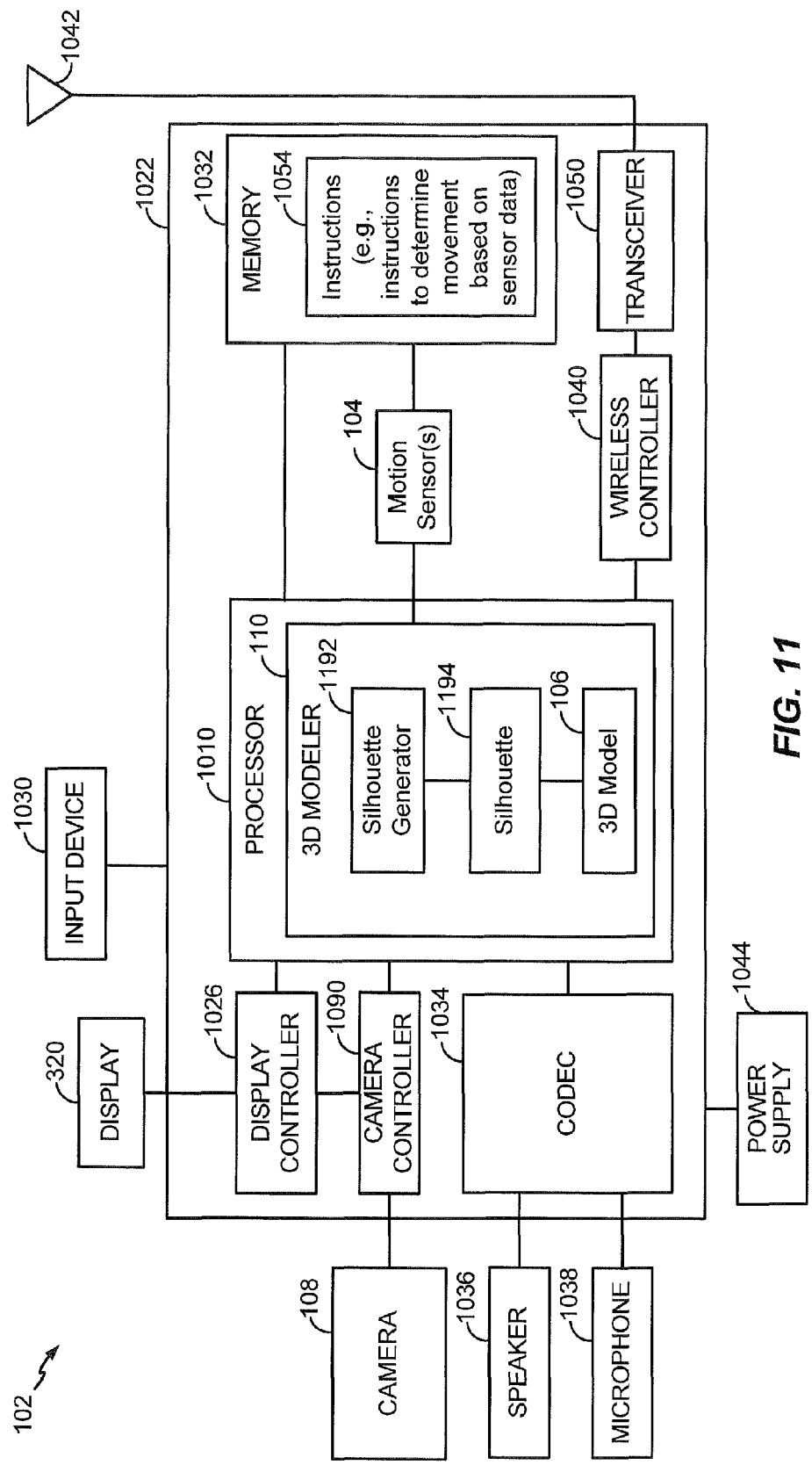

FIG. 10 is a diagram of another particular illustrative embodiment of the mobile device of FIG. 1, where the mobile device is configured to compute 3D models according to a feature point-based reconstruction technique (e.g., a bundle adjustment technique) based on motion sensor data; and FIG. 11 is a diagram of another particular illustrative embodiment of the mobile device of FIG. 1, where the mobile device is configured to compute 3D models according to a silhouette-based reconstruction technique (e.g., a visual hull technique) based on motion sensor data.

VI. DETAILED DESCRIPTION

Referring to FIG. 1, a diagram of a particular embodiment of a system is disclosed and generally designated 100. The system 100 includes a mobile device 102 including a camera 108 configured to capture one or more images (e.g., a first image 120 and a second image 122) of one or more objects, such as an object 130. The mobile device 102 further includes one or more motion sensors 104, one or more storage devices 106, and a 3D modeler 110. The 3D modeler 110 may be implemented using hardware, using processor-executable instructions stored at a computer-readable tangible medium, or a combination thereof, as described further below. The one or more motion sensors 104 may include one or more electrical, mechanical, electromechanical, or other sensors, such as a gyroscope, an accelerometer, other motion sensor devices, or a combination thereof.

The object 130 may include one or more feature points, such as apexes of the object 130, a base of the object 130, a handle of the object 130, text or graphics on the object 130, curves of the object 130, one or more other distinct portions of the object 130, or any combination thereof. Although FIG. 1 shows two images 120, 122 of the object 130 captured by the camera 108 when the mobile device 102 is at two positions, it should be noted that multiple images of the object 130 corresponding to multiple positions of the mobile device 102 may be captured by the camera 108.

The camera 108 may be configured to capture images of the object 130 at multiple positions of the mobile device 102 (e.g., at different angles and/or rotations with respect to a coordinate system or with respect to an initial position). For example, the camera 108 may capture a first image 120 of the object 130 when the mobile device 102 (and the camera 108) is at a first position (e.g., a first view 140 of the object 130) and the camera 108 may capture a second image 122 of the object 130 when the mobile device 102 (and the camera 108) is at a second position (e.g., a second view 150 of the object 130). In at least one embodiment, image data corresponding to the first view 140 and to the second view 150 may be stored at the one or more storage devices 106.

The one or more motion sensors 104 may be configured to generate motion sensor data that indicates a position of the mobile device 102 (e.g., rotation and/or translation of the mobile device 102 with respect to an initial position of the mobile device 102 or with respect to a coordinate system). For example, the one or more motion sensors 104 may be configured to generate motion sensor data 112 concurrently with the camera 108 capturing the first image 120. As another example, the one or more motion sensors 104 may be configured to generate motion sensor data 114 concurrently with the camera 108 capturing the second image 122. In at least one embodiment, the mobile device 102 uses the 3D modeler 110 to generate a 3D model 116 of the object 130 using the motion sensor data 112, 114 and further using image data related to the images 120, 122, as described further below.

During operation, the mobile device 102 may capture the first image 120 of the object 130 via the camera 108 based on the first view 140 of the camera 108. The mobile device 102 may move to a second position (e.g., due to movement of a user of the mobile device 102) and may capture the second image 122 of the object 130 via the camera 108 based on the second view 150 of the camera 108. The one or more motion sensors 104 of the mobile device 102 may output motion sensor data 112, 114 corresponding to motion information of the mobile device 102 that enables determination of movement of the mobile device 102 from the first position to the second position. The motion sensor data 112, 114 may indicate rotational and translational motion of the mobile device 102.

To illustrate, when the mobile device 102 is at the first position, the 3D modeler 110 may receive data corresponding to the first image 120 and may further receive the motion sensor data 112 output by the one or more motion sensors 104. Similarly, when the mobile device 102 is at the second position, the 3D modeler 110 may receive the data corresponding to the second image 122 and may further receive the motion sensor data 114 output by the one or more motion sensors 104. The motion sensor data 114 may indicate movement information of the mobile device 102 from the first position to the second position. For example, the motion sensor data 114 may include rotational and translational matrices of the mobile device 102 associated with rotation and translation of the mobile device 102 from the first position to the second position. As another example, the motion sensor data 112, 114 may provide information that enables generation of rotational and translational matrices of the mobile device 102. The motion sensor data 112, 114 may include or indicate a "camera pose" matrix obtained from the one or more motion sensors 104, as described further below.

For purposes of illustration, a non-limiting, example operation is provided of the 3D modeler 110 using the motion sensor data 112, 114 and data corresponding to the images 120, 122 to generate the 3D model 116 of the object 130. In a particular example, the 3D modeler 110 is configured to generate the 3D model 116 by calculating the bundle adjustment expression $$\min_{P^i, X_j} \sum_{i,j} d(P^i X_j, x_j^i)^2,$$

based on the motion sensor data 114 provided by the one or more motion sensors 104. According to such embodiments and as described further below, the 3D modeler 110 may output 3D feature points of the object 130 based on the calculation. The output 3D feature points correspond to a 3D model of the object 130. In a particular embodiment, computing the bundle adjustment expression may include determining feature points of the object 130 based on a function of a first estimated reprojected image point, a second estimated reprojected image point, and the data output by the one or more motion sensors 104. For example, computing the bundle adjustment expression may include determining the first estimated reprojected image point of the object 130 based on a product of a first estimate of the first position (i.e., $P^1$) and one or more feature points ($X_j$) of the object 130 (i.e., computing $P^1 X_j$). Computing the bundle adjustment expression may also include determining a second estimated reprojected image point of the object based on a product of a second estimate of the second position (i.e., $P^2$) and the one or more feature points ($X_j$) of the object 130 (i.e., computing $P^2 X_j$). Computing the bundle adjustment expression may also include determining a square of a first Euclidean distance between the first estimated reprojected image point and coordinates of the object 130 in the first image 120 (i.e., computing $d(P^1 X_j, x_j^1)^2$) and determining a square of a second Euclidean distance between the second estimated reprojected image point and coordinates of the object 130 in the second image 122 (i.e., computing $d(P^2 X_j, x_j^2)^2$). Computing the bundle adjustment expression may include modifying an estimate of the 3D model 116 to reduce or to "minimize" a sum of the square of the first Euclidean distance and the square of the second Euclidean distance (i.e., "minimizing" $d(P^1 X_j, x_j^1)^2 + d(P^2 X_j, x_j^2)^2$). The first estimate of the first position $P^1$ may also be modified to further reduce the sum of the squares. However, the second estimate of the second position $P^2$ is constrained such that $P^{i+1} = \beta P^1$, where $\beta$ indicates camera pose information, such as a rotation matrix R and/or a transformation matrix T. For example, in at least one embodiment, $\beta = [R_i | T_i]$. By constraining $P^2 \ldots P^n$, a complexity of generating the feature points may be significantly reduced. It should be noted that although a Euclidean distance function is shown in connection with the foregoing example, other distance functions may be utilized. For example, d(.) may represent a distance function such as a geometric distance or any other metric that measures the distance or difference between the projected feature coordinates and the measured feature coordinates in the images.

The camera pose information may be determined according to a variety of techniques. To illustrate, suppose at least one of the one or more feature points $X_j$ is "matched" (e.g., identified) in N images (e.g., the first image 120 and the second image 122) captured by the camera 108. The matched feature point may be denoted as $m^i$, where $m^i = [x^i, y^i, 1]^T$ for (i=1, ... N). The matched feature point $m^i$ is associated with a spatial position $M = [X\ Y\ Z\ 1]^T$. Accordingly, for a scaling factor $\mu^i$, $\mu^i [x^i, y^i, 1]^T = P^i M$ for i= 1, ..., N≥2, where $P^i = K^i [R^i | T^i]$ is the ith camera projection matrix and $K^i$ is a upper triangular calibration matrix (e.g., a 3×3 upper triangular calibration matrix) of the i-th camera of the mobile device 102 for i=1, ..., N (e.g., for a multi-camera embodiment of the camera 108, which is omitted from FIG. 1 for clarity of illustration). The upper triangular calibration matrix $K^i$ may be the same for images captured with a same camera (e.g., when the camera 108 is used to capture each of the N images, such as for a single-camera embodiment of the mobile device 102). $[R^i | T^i]$ may be the relative pose matrix associated with the i-th camera. Thus, $$AM = 0$$

$$\text{where } A = \begin{bmatrix} p_1^1 - x^1 p_3^1 \\ p_2^1 - y^1 p_3^1 \\ p_1^2 - x^2 p_3^2 \\ p_2^2 - y^2 p_3^2 \\ \vdots \\ p_1^N - x^N p_3^N \\ p_1^N - y^N p_3^N \end{bmatrix}$$

Here, $p_j^i$ is the jth row of the i-th camera's projection matrix and AM=0 may be a set of 2N homogeneous equations with three unknowns (X, Y, Z). Because all camera projection matrixes may be known and N may be equal to or greater than 2, the equation may have a least squares solution, which may enable "minimization" of algebraic reprojection error.

It will be appreciated that a bundle adjustment technique in accordance with the foregoing description may utilize camera pose data (e.g., the motion sensor data 112, 114) to enable simplified and computationally efficient determination of the 3D model 116. Conventional approaches (e.g., bundle adjustment calculations that do not utilize motion sensor information) may be subject to a computationally intensive "least squares solution," such as by obtaining a nonlinear solution to "minimize" geometric error:

$$\min_{X, p^i} \sum_{i=1}^{N} \left[ \left( x^i - \frac{p_1^i M}{p_3^i M} \right)^2 + \left( y^i - \frac{p_2^i M}{p_3^i M} \right)^2 \right].$$

Figure 2:
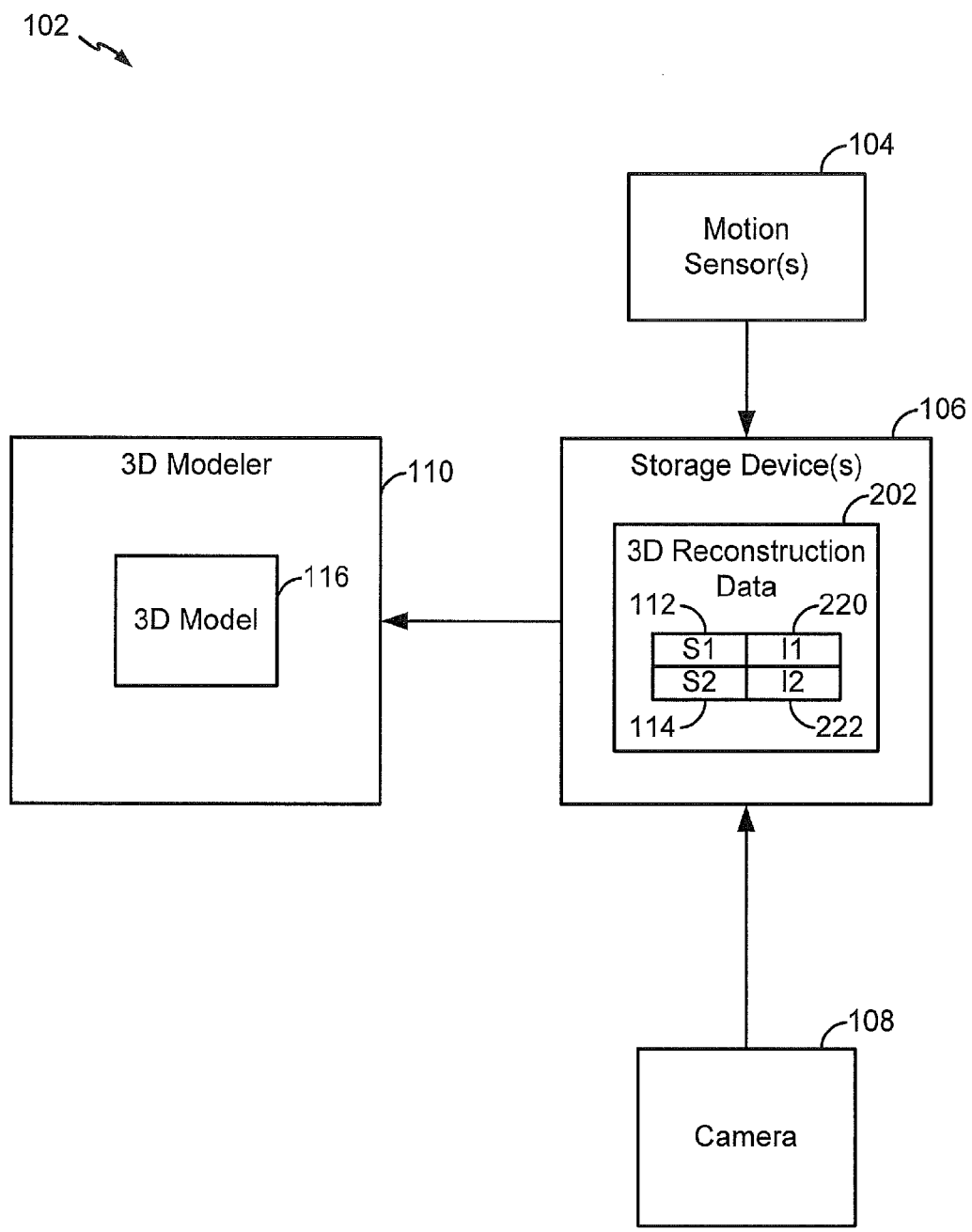
FIG. 2 is a diagram of a particular illustrative embodiment of the mobile device of FIG. 1.

FIG. 2 depicts a particular illustrative embodiment of the mobile device 102. The mobile device 102 of FIG. 2 includes the one or more motion sensors 104, the one or more storage devices 106, the camera 108, and the 3D modeler 110.

In the particular embodiment of FIG. 2, the one or more storage devices 106 store 3D reconstruction data 202 to be used by the 3D modeler 110 to generate the 3D model 116. The 3D reconstruction data 202 may include the motion sensor data 112, 114 and may further include first image data 220 and second image data 222 corresponding to the first image 120 of FIG. 1 and to the second image 122 of FIG. 1, respectively. The 3D model 116 may be displayed on a display of the mobile device 102 (not shown in FIG. 2).

According to a particular illustrative embodiment, the image data 220, 222 of FIG. 2 corresponds to a sequence of pictures, each picture individually captured in response to user input (e.g., "still" or "snapshot" pictures that are "manually" captured by a user and not part of a video sequence). In at least one embodiment, the example of FIG. 2 may be used in connection with an application of the mobile device 102 that enables users to generate 3D models, such as the 3D model 116, based on still pictures captured by users using the camera 108. According to additional embodiments and as discussed further below, the image data 220, 222 may correspond to video frames of a video frame sequence (e.g., sequential still images that are "automatically" periodically captured).

Figure 3:
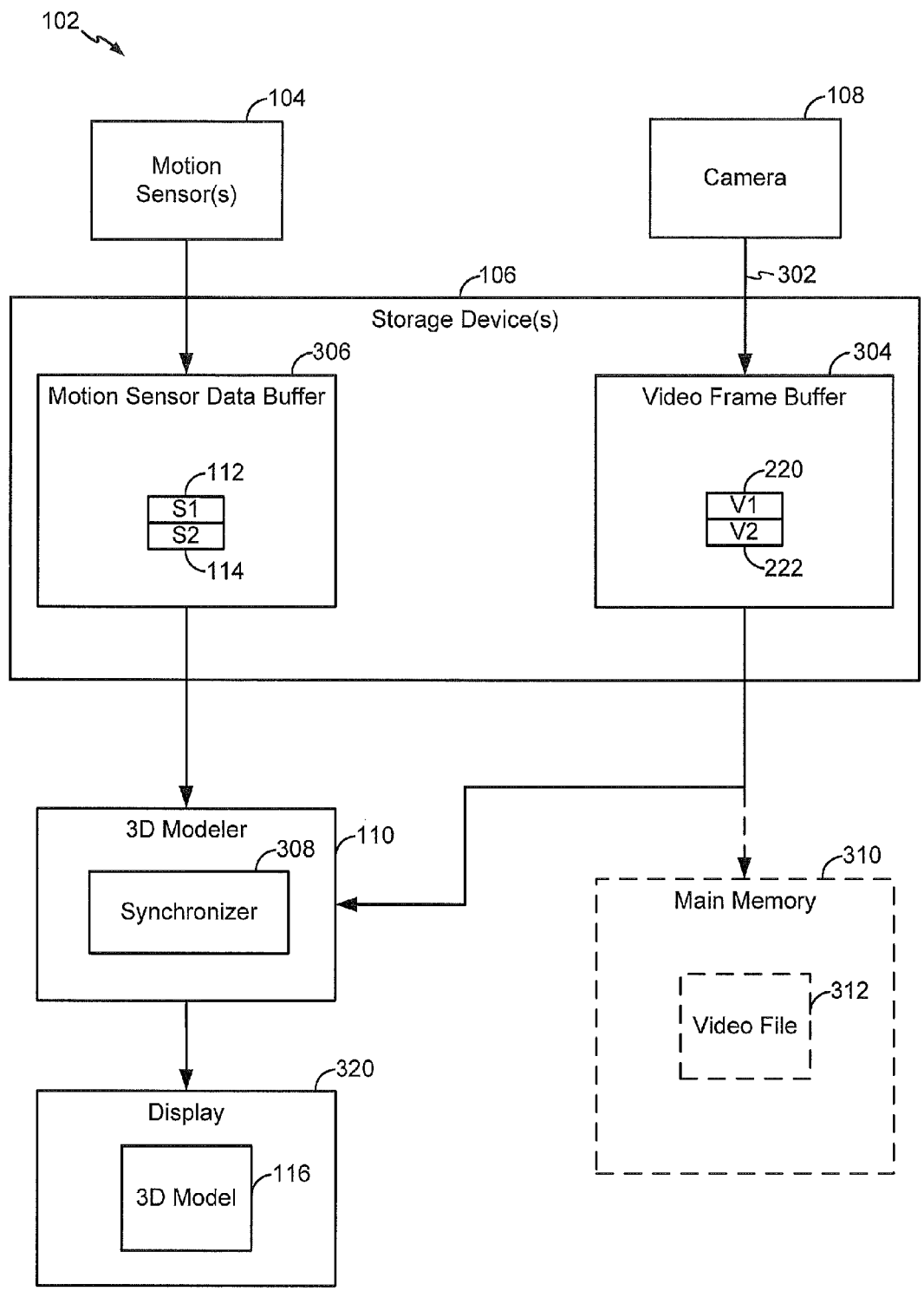
FIG. 3 is a diagram of another particular illustrative embodiment of the mobile device of FIG. 1.

FIG. 3 depicts another particular illustrative embodiment of the mobile device 102 described with reference to FIG. 1. The mobile device 102 of FIG. 3 includes the one or more motion sensors 104, the one or more storage devices 106, the camera 108, the 3D modeler 110, and a display 320. The 3D modeler 110 of FIG. 3 includes a synchronizer 308. The one or more storage devices 106 of FIG. 3 include a motion sensor data buffer 306 and a video frame buffer 304. Optionally, the mobile device 102 of FIG. 3 may include a main memory 310.

In operation, the camera 108 may capture a video frame sequence 302. The video frame buffer 304 may be responsive to the camera 108 and configured to store one or more video frames of the video frame sequence 302. For example, in the example of FIG. 3, the image data 220, 222 correspond to video frames of the video frame sequence 302. The motion sensor data buffer 306 may be responsive to the one or more motion sensors 104. The motion sensor data buffer 306 may store the motion sensor data 112, 114.

The synchronizer 308 may synchronize data from the video frame buffer 304 with respect to data from the motion sensor data buffer 306. For example, the synchronizer 308 may synchronize the first motion sensor data 112 with the first image data 220 and may further synchronize the second motion sensor data 114 with the second image data 222. According to at least a first technique, the synchronizer 308 synchronizes data from the video frame buffer 304 with respect to data from the motion sensor data buffer 306 by comparing timestamps, such as by comparing timestamps associated with the motion sensor data 112, 114 to timestamps associated with the image data 220, 222. According to at least a second technique, the synchronizer 308 periodically accesses data from the motion sensor data buffer 306 and from the video frame buffer 304. According to at least a third technique, the synchronizer 308 is responsive to the movement of the mobile device 102 (e.g., is responsive to the one or more motion sensors 104) and pulls data from the motion sensor data buffer 306 and from the video frame buffer 304 in response to the detected motion. Further techniques may utilize a combination of one or more of the first technique, the second technique, and the third technique. Optionally, the data output by the video frame buffer 304 may be stored at the main memory 310 as a video file 312 that includes the video frame sequence 302.

As will be appreciated, by pulling data from "temporary" storage (e.g., the video frame buffer 304 and the motion sensor data buffer 306 of FIG. 3) instead of the main memory 310, the 3D modeler 110 may operate "on the fly." For example, the 3D modeler 110 may generate the 3D model 116 and the mobile device 102 may display the 3D model 116 on the display 320 concurrently or substantially concurrently with the video frame sequence 302 being captured. As used herein, "on the fly," "concurrently," and "substantially concurrently" refer to a relationship between a view of a captured object and generation of a 3D model of the object that a user may perceive as being simultaneous.

Accordingly, the example illustrated in connection with FIG. 3 may correspond to an "on the fly" generation of the 3D model 116. For example, as a user moves the mobile device 102 about an object (such as the object 130 of FIG. 1), the 3D modeler 110 may "automatically" render the 3D model 116, which is displayed on the display 320 concurrently with the user movement. According to additional embodiments and as discussed further below, one or more embodiments may enable non-concurrent generation of 3D models based on motion sensor data and a video frame sequence.

Figure 4:
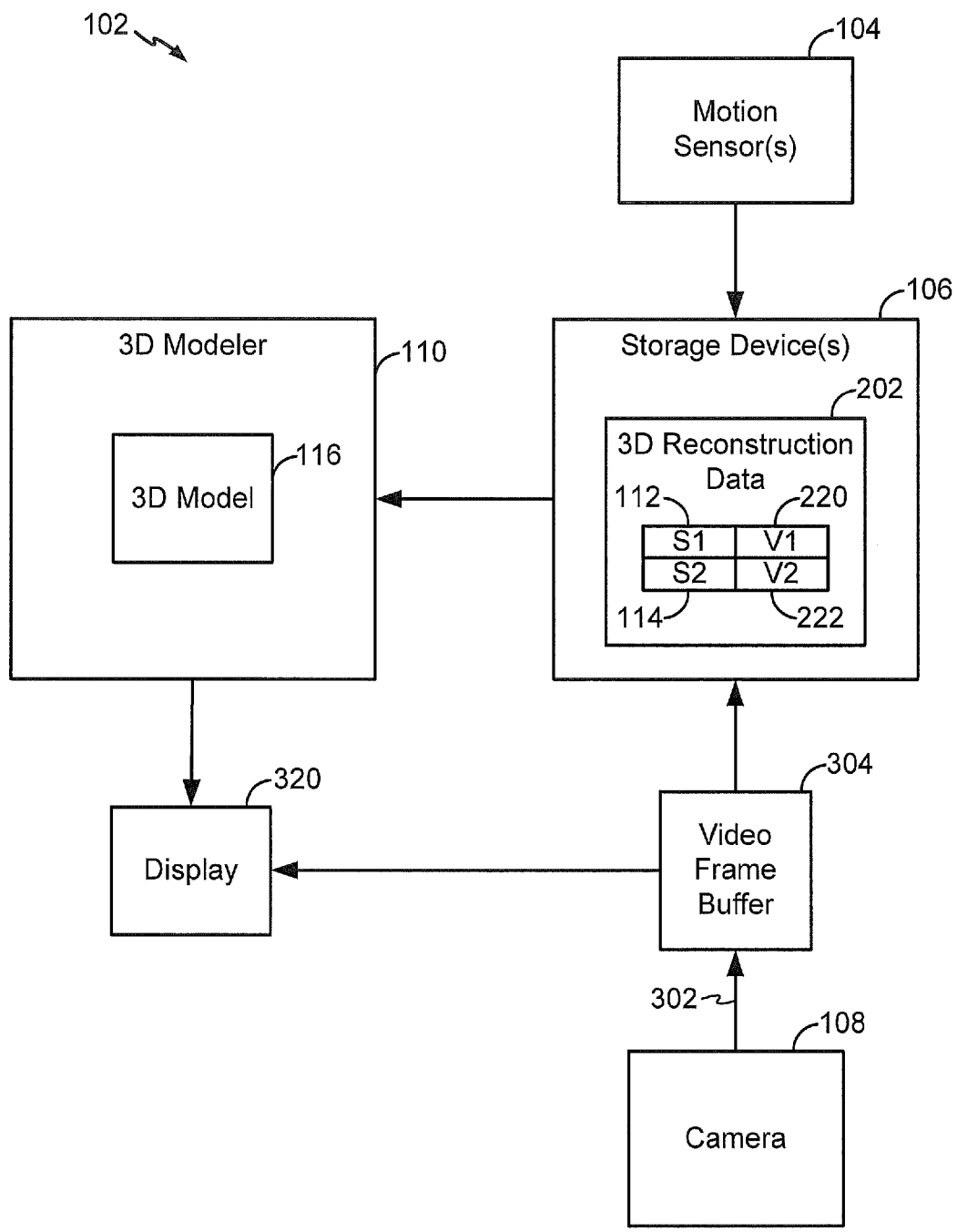
FIG. 4 is a diagram of another particular illustrative embodiment of the mobile device of FIG. 1.

FIG. 4 depicts another particular illustrative embodiment of the mobile device 102 described with reference to FIG. 1. The mobile device 102 of FIG. 4 includes the one or more motion sensors 104, the one or more storage devices 106, the camera 108, the 3D modeler 110, the video frame buffer 304, and the display 320.

In operation, the one or more motion sensors 104 may generate the motion sensor data 112, 114, which may be stored at the one or more storage devices 106. The camera 108 may capture the video frame sequence 302, which may be stored temporarily at the video frame buffer 304 and displayed at the display 320, such as in connection with a "preview" feature associated with the video frame sequence 302. For example, the video frame sequence 302 may be displayed at the display 320 prior to the video frame sequence 302 being stored at the one or more storage devices 106 (e.g., as the image data 220, 222) and/or prior to the 3D modeler 110 generating the 3D model 116.

Accordingly, in the particular embodiment of FIG. 4, the 3D modeler 110 may generate the 3D model 116 according to a "post-processing" technique. For example, because the 3D model 116 may not be generated and displayed concurrently with the video frame sequence 302 being captured by the camera 108, the display 320 can instead show a "preview" of the images being captured by the camera 108. Further, the display 320 may display user instructions for camera positioning (e.g., angles and/or positions at which the camera is to be held with respect to object being viewed). The 3D model 116 can thereafter be generated by the 3D modeler 110 by accessing the one or more storage devices 106, which may be a "main memory," such as the main memory 310 described in connection with FIG. 3.

Figure 5:
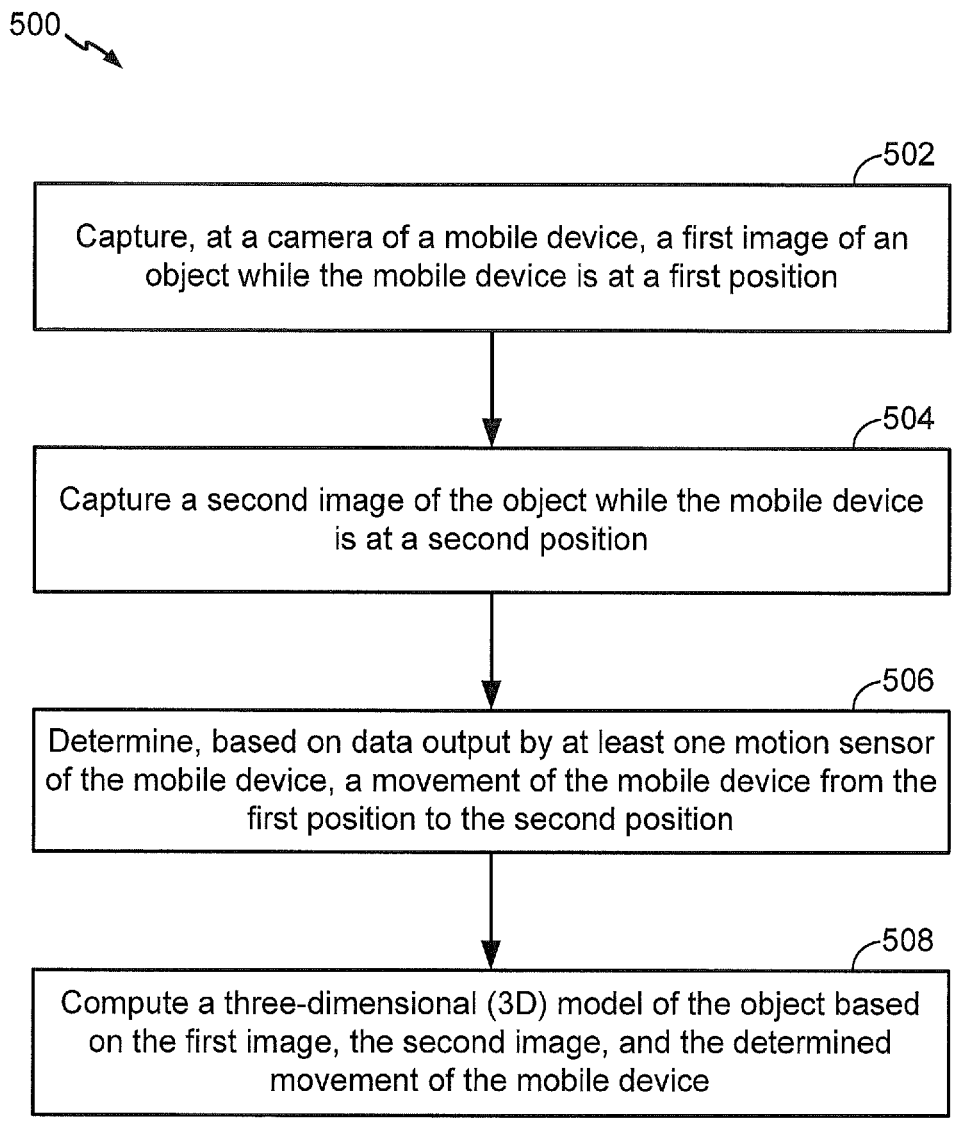
FIG. 5 is a flow diagram illustrating a particular embodiment of a method of computing a 3D model based on motion sensor data.

Referring to FIG. 5, a diagram illustrating a particular embodiment of a method of computing a 3D model based on motion sensor data is disclosed and generally designated 500. The method 500 includes capturing, at a camera of a mobile device, a first image of an object while the mobile device is at a first position, at 502, and capturing a second image of the object while the mobile device is at a second position, at 504. For example, the camera 108 may capture the first image 120 of the object 130 while the mobile device 102 is at the first position and the camera 108 may capture the second image 122 of the object 130 while the mobile device 102 is at the second position. The first image 120 may correspond to the first view 140 of the object 130 as captured by the camera 108 while at the first position and the second image 122 may correspond to the second view 150 of the object 130 as captured by the camera 108 while at the second position.

The method 500 further includes determining, based on data output by at least one motion sensor of the mobile device, a movement of the mobile device from the first position to the second position, at 506. For example, the one or more motion sensors 104 may output motion sensor data 112, 114 corresponding to motion information of the mobile device 102. In a particular embodiment, the motion information may include rotation and translation of the mobile device 102 from the first position to the second position. To illustrate, the one or more motion sensors may provide first rotational and/or translational matrices of the mobile device 102 corresponding to the first position and second rotational and/or translational matrices of the mobile device 102 corresponding to the second position. In at least one embodiment, the first position of the mobile device is used as a "reference" position, and the second position accordingly indicates a change in position of the mobile device. According to other embodiments, another position (e.g., a previous position, or a position associated with a predetermined coordinate system) is used as the "reference" position, and both the first position and the second position each indicate a change in position of the mobile device.

The method 500 also includes computing a 3D model of the object based on the first image, the second image, and the determined movement of the mobile device, at 508. For example, according to a feature point-based reconstruction technique and as described with reference to at least FIG. 1, the 3D modeler 110 may compute feature points of the object 130 based on the first image 120 and the second image 122. In a particular embodiment, the 3D modeler 110 may be configured to calculate the bundle adjustment expression $$\min_{P^i, X_j} \sum_{i,j} d(P^i X_j, x_j^i)^2$$

based on the motion sensor data 114 provided by the one or more motion sensors 104, the first image 120, and the second image 122. According to further embodiments and as described further below, the 3D model may be computed according to a silhouette-based technique (e.g., a visual hull technique).

Figure 6:
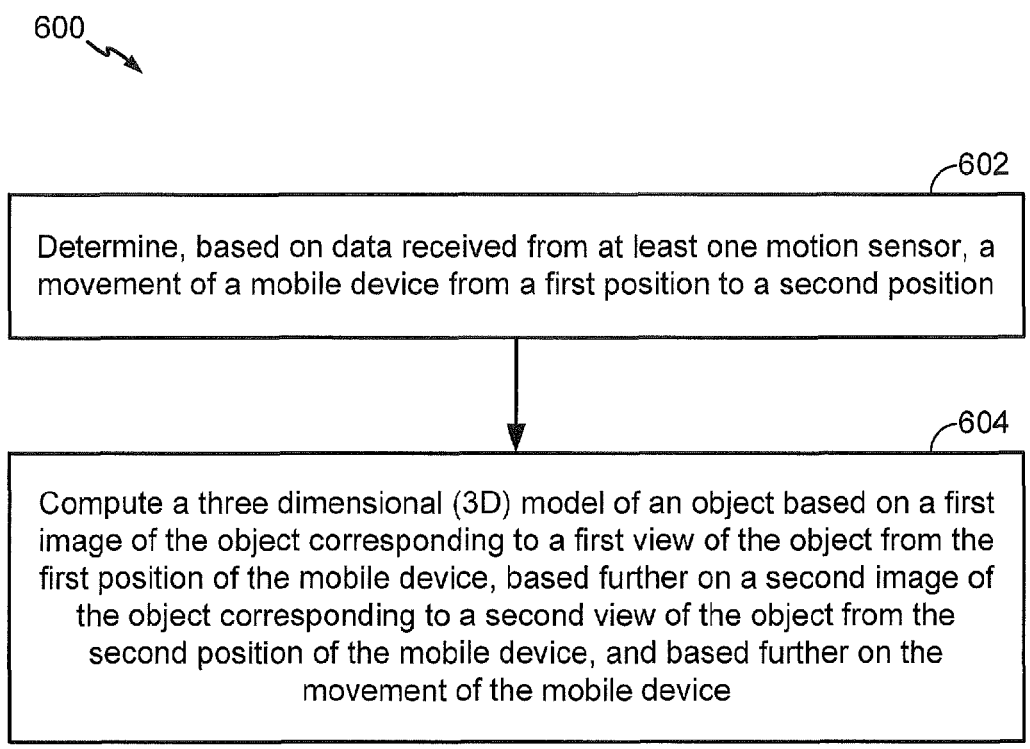
FIG. 6 is a flow diagram illustrating another particular embodiment of a method of computing a 3D model based on motion sensor data.

Referring to FIG. 6, a diagram illustrating another particular embodiment of a method of computing a three-dimensional (3D) model based on motion sensor data is disclosed and generally designated 600. The method 600 includes determining, based on data received from at least one motion sensor, a movement of a mobile device from a first position to a second position, at 602. The data, the at least one motion sensor, and the mobile device may correspond to the motion sensor data 112, 114, the one or more motion sensors 104, and the mobile device 102, respectively.

The method 600 further includes computing a 3D model of an object based on a first image of the object corresponding to a first view of the object from the first position of the mobile device, based further on a second image of the object corresponding to a second view of the object from the second position of the mobile device, and based further on the movement of the mobile device, at 604. For example, the camera 108 may capture the first image 120 of the object 130 while the mobile device 102 is at the first position and the camera 108 may capture the second image 122 of the object 130 while the mobile device 102 is at the second position. The first image 120 may correspond to the first view 140 of the object 130 as captured by the camera 108 while at the first position and the second image 122 may correspond to the second view 150 of the object 130 as captured by the camera 108 while at the second position.

Figure 7:
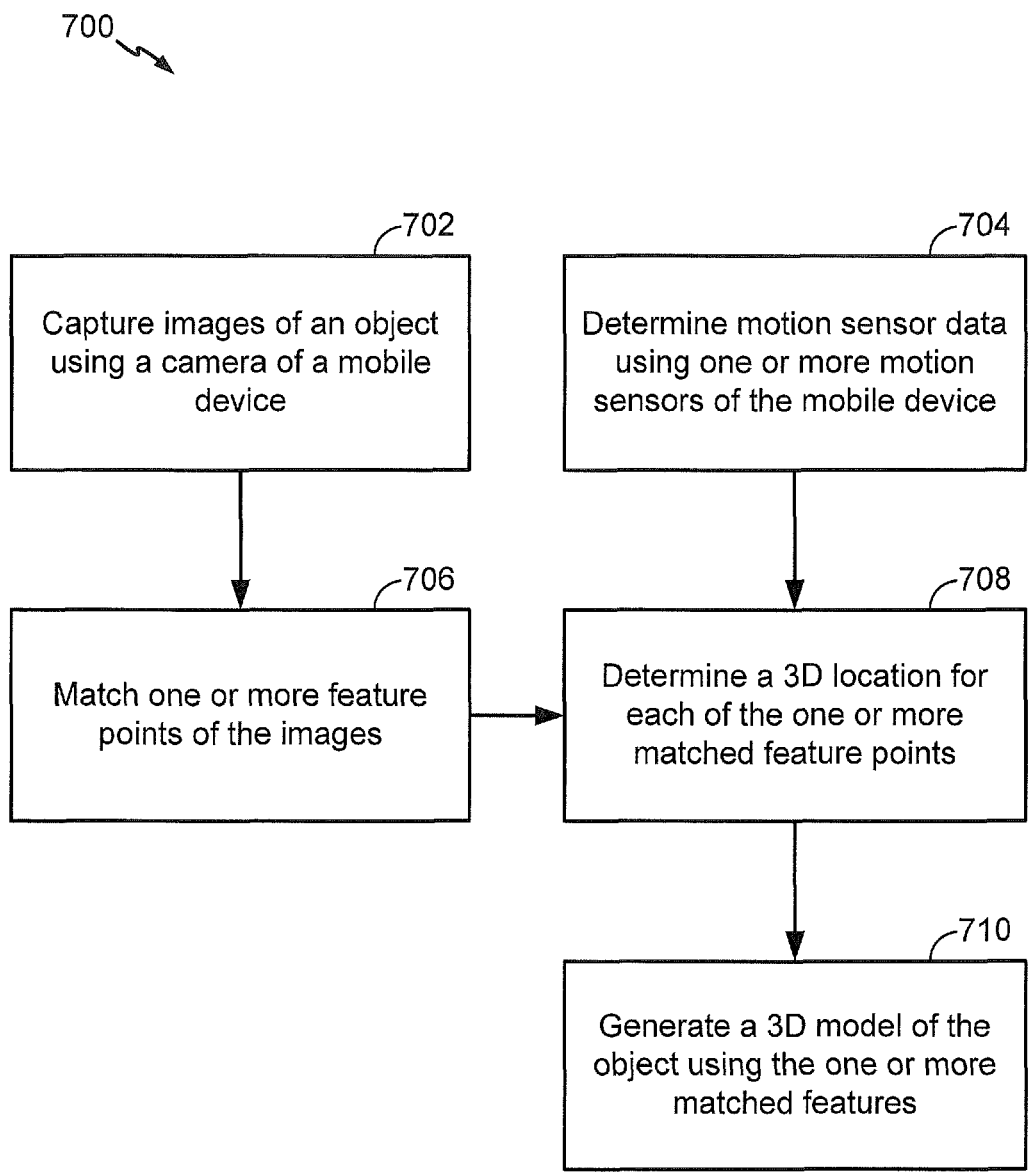
FIG. 7 is a flow diagram illustrating a particular embodiment of a method of computing a 3D model according to a feature point-based reconstruction technique (e.g., a bundle adjustment technique) based on motion sensor data.

Referring to FIG. 7, a flow diagram illustrating a particular embodiment of a method of computing a 3D model according to a feature point-based reconstruction technique (e.g., a bundle adjustment technique) based on motion sensor data is depicted and generally designated 700. The method 700 includes capturing images (e.g., the images 120, 122) of an object (e.g., the object 130) using a camera (e.g., the camera 108) of a mobile device (e.g., the mobile device 102), at 702.

At 704, the method 700 includes determining motion sensor data (e.g., the motion sensor data 112, 114) using one or more motion sensors (e.g., the one or more motion sensors 104). At 706, one or more feature points of the images are matched, and at 708, a 3D location for each of the one or more matched features is determined. Determining the one or more feature points and the 3D locations for each of the one or more matched feature points can be performed using any suitable technique, such as the bundle adjustment technique described above with reference to at least FIG. 1.

At 710, a 3D model of the object is generated using the one or more matched features (e.g., according to the bundle adjustment technique). In at least one embodiment, the method 700 of FIG. 7 is performed using a processor of the mobile device 102, as described further with reference to at least FIG. 10.

Figure 8:
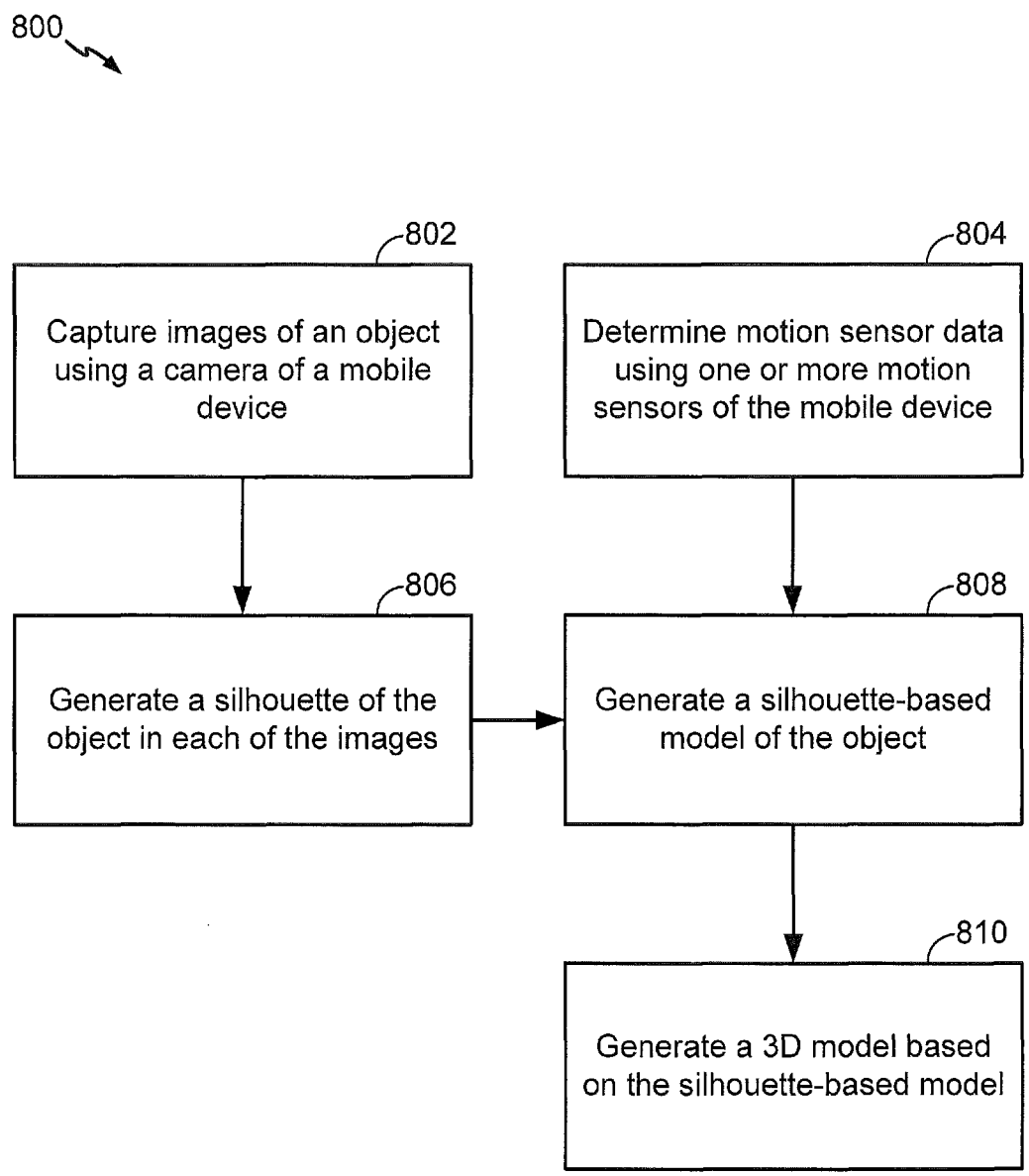
FIG. 8 is a flow diagram illustrating a particular embodiment of a method of computing a 3D model according to a silhouette-based reconstruction technique (e.g., a visual hull technique) based on motion sensor data.

Referring to FIG. 8, a flow diagram illustrating a particular embodiment of a method of computing a 3D model according to a silhouette-based reconstruction technique (e.g., a visual hull technique) based on motion sensor data is depicted and generally designated 800. The method 800 includes capturing images (e.g., the images 120, 122) of an object (e.g., the object 130) using a camera (e.g., the camera 108) of a mobile device (e.g., the mobile device 102), at 802.

At 804, motion sensor data (e.g., the motion sensor data 112, 114) is determined using one or more motion sensors (e.g., the one or more motion sensors 104) of the mobile device. A silhouette is generated of the object in each of the images, at 806. The method 800 further includes generating a silhouette-based model of the object, at 808, and generating a 3D model based on the silhouette-based model, at 810. A particular example of a silhouette-based reconstruction technique is described with reference to FIG. 9.

Figure 9:
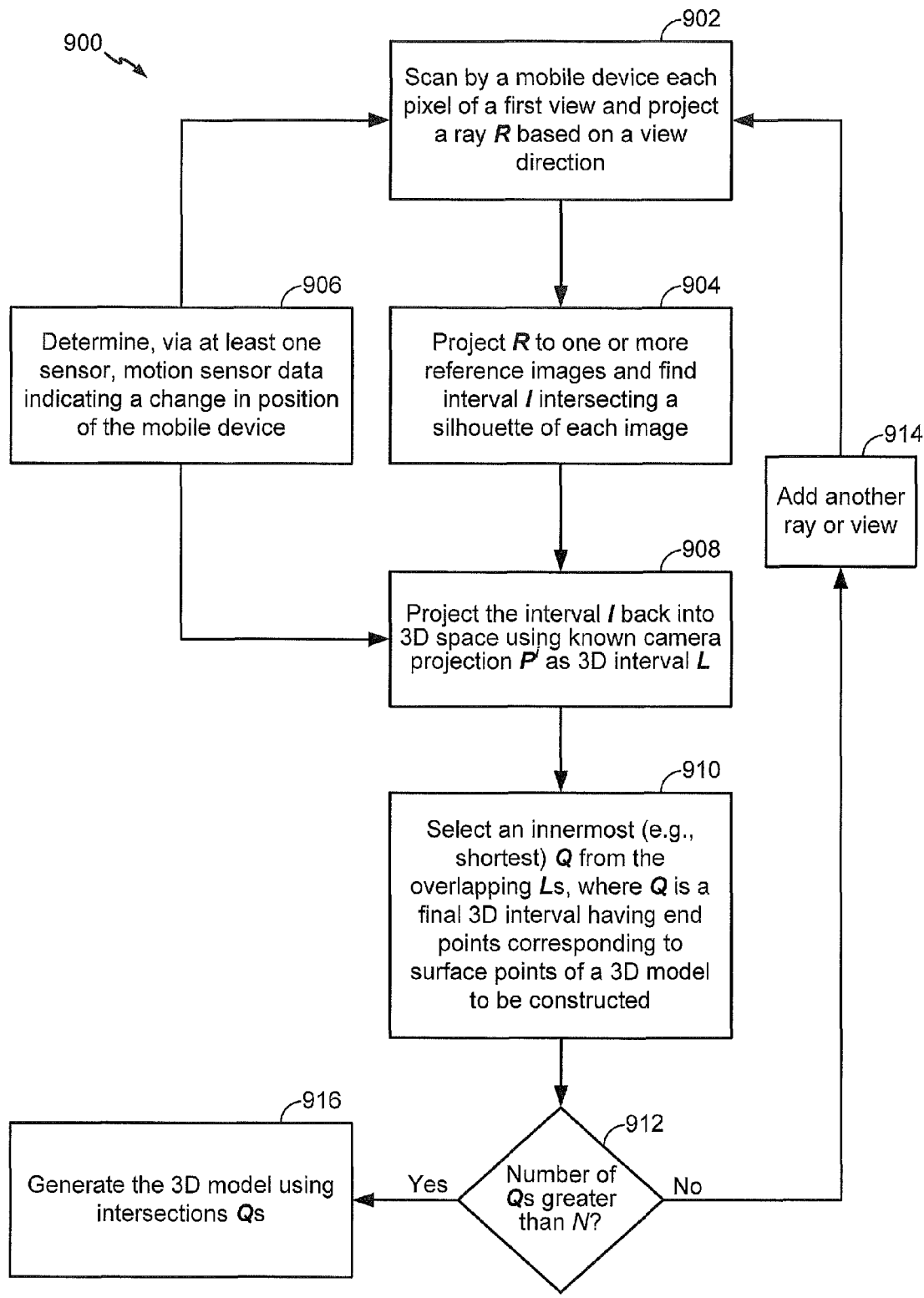
FIG. 9 is a flow diagram illustrating another particular embodiment of a method of computing a 3D model according to a silhouette-based reconstruction technique (e.g., a visual hull technique) based on motion sensor data.

Referring to FIG. 9, a flow diagram illustrating another particular embodiment of a method of computing a 3D model according to a silhouette-based reconstruction technique (e.g., a visual hull technique) based on motion sensor data is depicted and generally designated 900. The method 900 includes scanning by a mobile device (e.g., the mobile device 102) each pixel of a first view and projecting a ray R based on a view direction, at 902. At 904, the ray R is projected to one or more reference images and an interval I is found such that the interval I intersects a silhouette of each of the images.

At 906, motion sensor data (e.g., the motion sensor data 112, 114) indicating a change in position of the mobile device (e.g., from a first position to a second position) is determined via at least one sensor (e.g., via the one or more motion sensors 104). In at least one embodiment, the motion sensor data determined at 906 is used to project the ray R to the one or more reference images, at 902. The method 900 further includes projecting the interval I back into 3D space using a known camera projection $P^I$ as a 3D interval L, at 908. The known camera projection $P^i$ may be derived from the motion sensor data. The method 900 further includes selecting an innermost (e.g., shortest) intersection Q from the overlapping Ls, where Q is a final 3D interval having end points corresponding to surface points of a 3D model to be constructed, at 910. In response to the number of intersections Qs being less than a threshold N, another ray or view is added, at 914. In response to the number of Qs satisfying the threshold N, the 3D model (e.g., the 3D model 116) is generated using the intersections Qs. The method 800 of FIG. 8, the method 900 of FIG. 9, or a combination thereof, may be performed using a processor of the mobile device 102, as described further with reference to at least FIG. 11.

FIG. 10 is a diagram of another particular illustrative embodiment of the mobile device 102, where the mobile device 102 is configured to compute 3D models according to a feature point-based reconstruction technique (e.g., a bundle adjustment technique) based on motion sensor data. The mobile device 102 of FIG. 10 includes a processor, such as a processor 1010, coupled to a memory 1032, and to the one or more motion sensors 104. The one or more motion sensors 104 may also be coupled to the memory 1032.

The memory 1032 may be a computer-readable non-transitory medium that stores data (e.g., motion data of the mobile device 102), instructions, or a combination thereof In a particular embodiment, the memory 1032 may include instructions 1054 that may be executable by the processor 1010 to cause the processor 1010 to perform one or more functions of the mobile device 102. For example, the instructions 1054 may include user applications, an operating system, or other executable instructions, or a combination thereof. The instructions 1054 may be executable by the processor 1010 to cause the processor 1010 to perform one or more operations described herein, such as to determine movement of the mobile device 102 based on motion sensor data (e.g., the motion sensor data 112, 114) determined by the one or more motion sensors 104. In at least one embodiment, the memory 1032 is a "main memory," such as the main memory 310 described with reference to FIG. 3. Alternatively or in addition, the memory 1032 may include the one or more storage devices 106, the motion sensor data buffer 306, the video frame buffer 304, or a combination thereof.

The processor 1010 may include the 3D modeler 110. For example, the 3D modeler 110 may be a hardware component of the processor 1010, a set of instructions (e.g., instructions stored at the memory 1032) executable by the processor 1010, or a combination thereof. In the particular embodiment of FIG. 10, the 3D modeler 110 includes a feature point generator 1092, which may determine feature points 1094 of captured images (e.g., the first image 120 and the second image 122 of FIG. 1) of an object in connection with a feature-point based reconstruction technique. The 3D modeler 110 may generate the 3D model 116 based on the feature points 1094.

FIG. 10 illustrates the camera 108 coupled to a camera controller 1090 that may provide the images 120, 122 and/or video data to be processed by the 3D modeler 110. The camera controller 1090 may be coupled to the processor 1010 and to a display controller 1026. The camera 108 may be a video camera, a non-video camera, a single camera, a multi-camera (e.g., a stereo camera), or a combination thereof.

FIG. 10 also shows that the display controller 1026 may be coupled to the processor 1010 and to the display 320. A coder/decoder (CODEC) 1034 (e.g., an audio and/or voice CODEC) may be coupled to the processor 1010. A speaker 1036 and a microphone 1038 may be coupled to the CODEC 1034. FIG. 10 also indicates that a wireless controller 1040 may be coupled to the processor 1010 and to a transceiver 1050 that is coupled to a wireless antenna 1042. In a particular embodiment, the processor 1010, the one or more motion sensors 104, the camera controller 1090, the display controller 1026, the memory 1032, the CODEC 1034, the wireless controller 1040, and the transceiver 1050 are included in a system-in-package or system-on-chip device 1022.

In a particular embodiment, an input device 1030 and a power supply 1044 are coupled to the system-on-chip device 1022. Moreover, in a particular embodiment, and as illustrated in FIG. 10, the display 320, the camera 108, the input device 1030, the speaker 1036, the microphone 1038, the wireless antenna 1042, and the power supply 1044 are external to the system-on-chip device 1022. However, each of the display 320, the input device 1030, the speaker 1036, the microphone 1038, the wireless antenna 1042, and the power supply 1044 can be coupled to a component of the system-on-chip device 1022, such as an interface or a controller. Although the one or more motion sensors 104 are illustrated as included in the system-on-chip device 1022, in other embodiments the one or more motion sensors 104 may be external to the system-on-chip device 1022 and coupled to the system-on-chip device 1022.

FIG. 11 is a diagram of another particular illustrative embodiment of the mobile device 102, where the mobile device 102 is configured to compute 3D models according to a silhouette-based reconstruction technique (e.g., a visual hull technique) based on motion sensor data. Certain components and features of the mobile device 102 of FIG. 11 may be described generally with reference to the mobile device 102 of FIG. 10, such as the processor 1010, the one or more motion sensors 104, the camera controller 1090, the display controller 1026, the memory 1032, the instructions 1054, the CODEC 1034, the wireless controller 1040, the transceiver 1050, the system-in-package or system-on-chip device 1022, the wireless antenna 1042, the input device 1030, the display 320, the camera 108, the speaker 1036, the microphone 1038, and the power supply 1044. However, the 3D modeler 110 of FIG. 11 includes a silhouette generator 1192 to generate a silhouette 1194, for example in connection with a visual hull technique. The silhouette 1194 may be used by the 3D modeler 110 to generate the 3D model 116.

Although the present disclosure is described in connection with a mobile device (e.g., the mobile device 102) for ease of illustration, it should be appreciated that the functionalities described herein may be implemented using other devices. For example, the processor 1010 and the memory 1032 of FIGS. 10 and 11 may be integrated into a multimedia player, an entertainment unit, a navigation device, a personal digital assistant (PDA), a fixed location data unit, or a computer (e.g., a tablet computer, a laptop computer, a desktop computer, etc.), a media device, another device configured to wirelessly communicate data, or a combination thereof. Further, although for convenience of illustration various techniques (e.g., reconstruction techniques, such as feature point-based and silhouette-based reconstruction techniques) have been described separately, one or more such techniques (or elements thereof) can be combined.

In conjunction with the described embodiments, an apparatus is disclosed that includes means for determining, based on data received from at least one means for sensing motion, a movement of a mobile device from a first position to a second position. For example, the means for determining may include the 3D modeler 110 of FIGS. 1-4, 10, and 11, the processor 1010 of FIGS. 10 and 11, one or more other devices configured to determine a movement of a mobile device, or any combination thereof. The means for sensing motion may include the one or more motion sensors 104.

The apparatus further includes means for computing a three-dimensional (3D) model of an object based on a first image of the object corresponding to a first view of the object from the first position of the mobile device, based further on a second image of the object corresponding to a second view of the object from the second position of the mobile device, and based further on movement of the mobile device. For example, the means for computing the 3D model may include the 3D modeler 110 of FIGS. 1-4, 10, and 11, the processor 1010 of FIGS. 10 and 11, one or more other devices configured to compute a 3D model, or any combination thereof.

Those of skill would further appreciate that the various illustrative logical blocks, configurations, modules, circuits, and algorithm steps described in connection with the embodiments disclosed herein may be implemented as electronic hardware, processor-executable instructions stored at a computer-readable tangible medium, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
   determining, based on data output by at least one motion sensor of a mobile device, a movement of the mobile device from a reference position to a second position; and
   computing, using a bundle adjustment technique, at least a first portion of a three-dimensional (3D) model of an object based on a first image corresponding to a first view of the object from the reference position, a second image corresponding to a second view of the object from the second position, and the movement of the mobile device, wherein the bundle adjustment technique includes estimating a second projection matrix associated with the second image based at least on a first projection matrix associated with the first image and a relative pose matrix based on the movement of the mobile device from the reference position to the second position.

2. The method of claim 1, further comprising:
   capturing, at a camera of the mobile device, the first image while the mobile device is at the reference position;
   capturing, at the camera, the second image of the object while the mobile device is at the second position; and displaying an image corresponding to the 3D model, wherein the first image and the second image are video frames associated with a stored video file.

3. The method of claim 1, wherein the first image and the second image are video frames associated with a video frame sequence, and further comprising accessing the video frames prior to storing the video frame sequence as a video file.

4. The method of claim 1, further comprising computing a second portion of the 3D model of the object based on a second movement of the mobile device from the second position to a third position, and wherein an image corresponding to the 3D model is displayed at the mobile device while the mobile device is moved from the second position to the third position.

5. The method of claim 1, wherein the data output by the at least one motion sensor indicates rotational motion associated with the mobile device, translational motion associated with the mobile device, or a combination thereof, and wherein the movement of the mobile device includes a rotation of the mobile device, a translation of the mobile device, or a combination thereof.

6. The method of claim 1, further comprising computing a second portion of the 3D model, wherein computing the second portion of the 3D model comprises:
projecting into a 3D space first rays from the reference position through pixels of the first image corresponding to the object;
projecting into the 3D space second rays from the second position through pixels of the second image corresponding to the object;
identifying intersections of the first rays and the second rays;
selecting a shortest intersection of the intersections; and
generating the second portion of the 3D model using the shortest intersection.

7. The method of claim 1, wherein computing the first portion of the 3D model of the object further comprises determining feature points of the object based on a function of a first estimated reprojected image point, a second estimated reprojected image point, and the data output by the at least one motion sensor, and wherein computing the first portion of the 3D model is based on 3D spatial positions associated with the feature points.

8. The method of claim 1, wherein computing the first portion of the 3D model of the object further comprises:
determining a first estimated reprojected image point of the object based on a product of a first estimate of the reference position and one or more feature points of the object;
determining a second estimated reprojected image point of the object based on a product of a second estimate of the second position and the one or more feature points of the object;
determining a square of a first Euclidean distance between the first estimated reprojected image point and coordinates of the object in the first image;
determining a square of a second Euclidean distance between the second estimated reprojected image point and coordinates of the object in the second image; and
modifying an estimate of the 3D model to minimize a sum of the square of the first Euclidean distance and the square of the second Euclidean distance,
wherein the second estimate of the second position is generated based on the first estimate of the reference position and the data output by the at least one motion sensor.

9. The method of claim 1, wherein the bundle adjustment technique is performed to determine a maximum likelihood solution of:

$$\min_{P^i, X_j} \sum_{i,j} d(P^i X_j, x_j^i)^2,$$

wherein d is associated with a distance operation,
wherein $P^i$ is a projection matrix,
wherein $X^j$ is a j-th feature point of the object, and
wherein $x_j^i$ are coordinates of the j-th feature point in an i-th image.

10. An apparatus comprising:
a camera configured to capture a first image of an object while at a reference position and to capture a second image of the object while at a second position;
at least one motion sensor; and
a processor configured to:
determine, based on data output by the at least one motion sensor, a movement of the camera from the reference position to the second position; and
compute, using a bundle adjustment technique, a first portion of a three-dimensional (3D) model of the object based on the first image, the second image, and the movement of the camera, wherein the bundle adjustment technique includes estimating a second projection matrix associated with the second image based at least on a first projection matrix associated with the first image and a relative pose matrix based on the movement of the camera from the reference position to the second position.

11. The apparatus of claim 10, wherein the processor is integrated into a mobile device, the camera, a multimedia player, an entertainment unit, a navigation device, a personal digital assistant (PDA), a portable computer, or any combination thereof.

12. The apparatus of claim 10, wherein the data output by the at least one motion sensor includes rotational information associated with the camera, translational information associated with the camera, or a combination thereof, and wherein the movement of the camera includes a rotation of the camera, a translation of the camera, or a combination thereof.

13. The apparatus of claim 10, wherein the processor is further configured to determine feature points of the object based on a function of a first estimated reprojected image point, a second estimated reprojected image point, and the data output by the at least one motion sensor.

14. The apparatus of claim 10, wherein the processor is further configured to:
determine a first estimated reprojected image point of the object based on a product of a first estimate of the reference position and one or more feature points of the object;
determine a second estimated reprojected image point of the object based on a product of a second estimate of the second position and the one or more feature points of the object;
determine a square of a first Euclidean distance between the first estimated reprojected image point and coordinates of the object in the first image;
determine a square of a second Euclidean distance between the second estimated reprojected image point and coordinates of the object in the second image; and modify an estimate of the first portion of the 3D model to minimize a sum of the square of the first Euclidean distance and the square of the second Euclidean distance, wherein the second estimate of the second position is generated based on the first estimate of the reference position and the data output by the at least one motion sensor.

15. A method comprising:

capturing, at a camera of a mobile device, a first image of an object while the mobile device is at a reference position;

capturing a second image of the object while the mobile device is at a second position;

determining, based on data received from at least one motion sensor, a movement of a mobile device from the reference position to the second position; and computing, using a bundle adjustment technique, a first portion of a three-dimensional (3D) model of an object based on the first image, based further on the second image, and based further on the movement of the mobile device, wherein the bundle adjustment technique includes estimating a second projection matrix associated with the second image based at least on a first projection matrix associated with the first image and a relative pose matrix based on the movement of the mobile device from the reference position to the second position.

16. An apparatus comprising:

means for determining, based on data received from at least one means for sensing motion, a movement of a mobile device from a reference position to a second position; and means for computing a portion of a three-dimensional (3D) model of an object based on a first image of the object corresponding to a first view of the object from the reference position, based further on a second image of the object corresponding to a second view of the object from the second position, based further on the movement of the mobile device, and based further on an estimate of a second projection matrix associated with the second image based at least on a first projection matrix associated with the first image and a relative pose matrix based on the movement of the mobile device from the reference position to the second position.

17. A computer-readable non-transitory medium comprising instructions that, when executed by a processor, cause the processor to:

determine, based on data received from at least one motion sensor, a movement of a mobile device from a reference position to a second position; and compute, using a bundle adjustment technique, a first portion of a three-dimensional (3D) model of an object based on a first image of the object corresponding to a first view of the object from the reference position of the mobile device, based further on a second image of the object corresponding to a second view of the object from the second position of the mobile device, and based further on the movement of the mobile device, wherein the bundle adjustment technique includes estimating a second projection matrix associated with the second image based at least on a first projection matrix associated with the first image and a relative pose matrix based on the movement of the mobile device from the reference position to the second position.

18. The non-transitory computer-readable medium of claim 17, further comprising instructions executable by the processor to determine feature points of the object based on a function of a first estimated reprojected image point, a second estimated reprojected image point, and the data.

19. The non-transitory computer-readable medium of claim 17, further comprising instructions executable by the processor to generate one or more silhouettes associated with the object, wherein a second portion of the 3D model of the object is based on the one or more silhouettes.

20. The method of claim 1, wherein the second position is distinct from the reference position.

21. The method of claim 1, further comprising:
determining the first projection matrix;
determining the relative pose matrix; and
estimating the second projection matrix based at least on the first projection matrix and the relative pose matrix.

22. The method of claim 1, wherein the first image and the second image are still images, and wherein the first image and the second image are captured in response to user input.

23. The method of claim 15, wherein the 3D model is computed concurrently with capturing at least one of the first image and the second image.

24. The method of claim 1, wherein the bundle adjustment technique is performed without performing a least squares calculation.

25. The method of claim 1, further comprising:
identifying intersections of first rays and second rays, the first rays projected into a 3D space from the reference position through pixels of the first image, and the second rays projected into the 3D space from the second position through pixels of the second image; and
generating a second portion of the 3D model using a shortest intersection of the intersections.

26. The apparatus of claim 16, wherein the means for determining and the means for computing are integrated into the mobile device, and wherein the mobile device comprises a communication device, a camera, a multimedia player, an entertainment unit, a navigation device, a personal digital assistant (PDA), a portable computer, or any combination thereof.

* * * * *